United States Patent Office 3,288,142
Patented Nov. 29, 1966

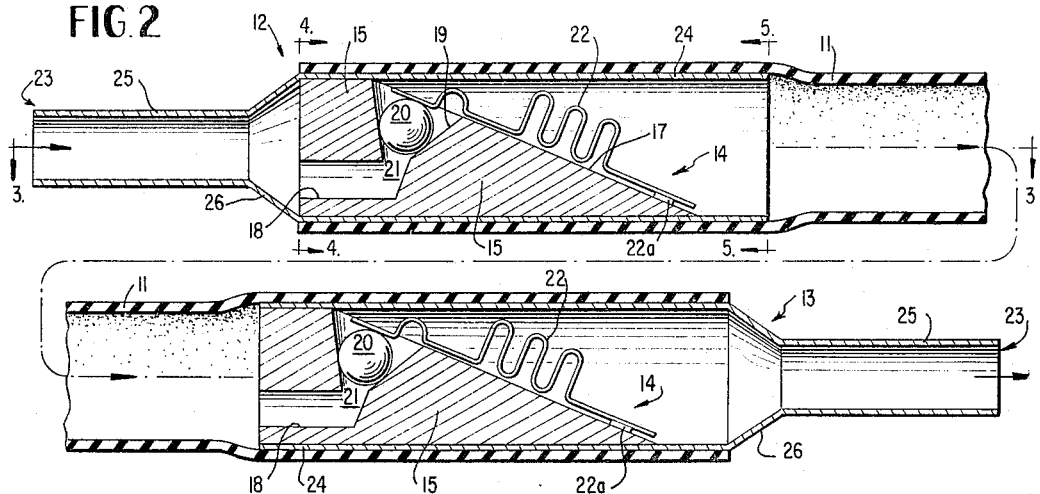

3,288,142
HYDROCEPHALUS SHUNT WITH SPRING BIASED
ONE-WAY VALVES
Salomon Hakim, Hospital Militar Surgical Dept.,
Bogota, Colombia
Filed Apr. 27, 1964, Ser. No. 363,110
10 Claims. (Cl. 128—350)

This invention relates to a new type of surgical drain valve device used to control the drainage of fluids between different portions of the body of a patient, particularly for draining cerebrospinal fluid from the cerebral ventricles into the blood stream (ventriculo-atriostomy) for cases of hydrocephaly and similar conditions in which there is difficulty in the free circulation and absorption of spinal cerebral fluid.

Several mechanical devices for controlling the drainage of cerebrospinal fluid into the blood stream are in use, of which the shunt device of U.S. Patent 3,109,429 is typical. These devices include a flow control device installed in the drain conduit leading from the cerebral ventricles into the blood stream so that the flow is unidirectional from the lateral ventricle into the jugular vein. However, the flow control mechanisms of the formerly known devices utilize a tube or nipple of soft and resilient material, such as silicone rubber, having a slit or closely adjacent flaps in the wall of the tube which form a passage through which the fluid flows. The slits or flaps are normally open to permit the fluid to flow from the inside to the outside of the tube, but the flaps or sides of the slits are squeezed together when pressure on the outside of the tube is greater than the internal pressure to prevent reverse flow.

These slit-type devices have an inherent problem in that the facing walls of rubber material tend to adhere. Further, the plastic or rubber materials of these mechanisms, being heat sensitive, do not permit adequate sterilization in an autoclave as they must not be exposed to temperatures at which the rubber material will be deteriorated or soften. In addition, the materials from which the devices are constructed will change in strength and elasticity in time and their manometric constant (aperture pressure) will change. These flow control devices also are rather easily obstructed by cerebral tissue debris which collects in them after a reasonably short period of use. Because of inadequate sterilization, infection (endocarditis, septicemia, meningitis, phlebitis) is frequently encountered with these devices. After several months, the patient sometimes exhibits symptoms of progressively developing intracranial hypertension. This is due to the changing manometric constant of the flow control device with the passage of time and by the resulting greater pressure required to open the valve.

Therefore, an object of this invention is to develop an improved, simple, and highly reliable ventriculo-atrial shunt valve which can be utilized with the maximum degree of safety to the patient.

Another object is to develop a shunt valve which can be sterilized in an autoclave without damage to the valve.

Yet another object of the invention is to develop a shunt valve having an unchanging manometric constant over a period of time.

Still another object is to develop a shunt valve which is self-cleaning and does not tend to become obstructed with cerebral debris.

The applicant has achieved these objectives by producing a valving device comprising a pair of spring operated ball-type check valves made of metal or other relatively inert and non-toxic material not affected by temperatures in the surgical sterilization range. The twin valves are arranged in series to face in the same direction (outlet of one adjacent the inlet of the other) and are connected by a flexible pumping tube. The valve structure is of stainless steel or equivalent stable material and has a hard, highly polished ball (sapphire) seating against a highly polished valve seat by a spring of stainless steel or equivalent material. The valves can be sterilized in an autoclave along with other surgical instruments, the valve spring constant is essentially unaffected by heat or time, the valve is positive in its operation, and any cerebral debris will be ground into small particles between the hard surfaces of the ball and the seat to be flushed away.

All of the above is more fully explained in the detailed description of a preferred embodiment of the invention which follows, this description being illustrated by the accompanying drawing wherein:

FIGURE 1 is a side elevation of the complete valve device with the central tubular portion foreshortened.

FIGURE 2 is a longitudinal section view of the device illustrated in FIGURE 1 greatly enlarged, the right hand portion of the device being located beneath the left hand portion.

FIGURE 3 is a sectional view taken along section lines 3—3 of FIGURE 2.

FIGURE 4 is a sectional view taken along lines 4—4 of FIGURE 2.

FIGURE 5 is a sectional view taken along sections 5—5 of FIGURE 2.

The shunt valve device 10 comprises a flexible length of hollow tubing 11, preferably made from siliconized rubber, connecting each of two identical valve assemblies 12 and 13. These two valve assemblies, two normally closed ball type check valves, are arranged in series, as illustrated in FIGURES 1 and 2, with the inlet end of both valves facing in the same direction, i.e., to the left in the drawings.

Each check valve assembly comprises a check valve 14 fitted within an outer hollow, cylindrical capsule 23 which is open at both ends. The structure of the check valves 14 of both valve assemblies 12 and 13 are identical with the body portion 15 being formed from an elongated cylinder, preferably of stainless steel, which is cut obliquely along its longitudinal axis from a point spaced from but near the inlet end face 16 of the body 15 to form a downwardly sloping face 17, which forms the outlet end portion of the valve body. An inlet passage 18 extends inwardly into the body 15 parallel to its longitudinal axis below the center line from the inlet end face 16. At the upper end of the obliquely slanting outlet end face 17, a funnel-shape bore 19 extends downwardly into the body 15 to meet the inlet passage 18, the funnel-shape section 19 symmetrically decreasing in diameter from the outside of the body as an inverted frusto-conical shape. The conical shaped section of the bore 19 is polished to a mirror-like finish and holds a ball 20 which is loosely contained therewithin. The ball 20 is a highly polished sphere of either the identical material as the valve body 15 or a hard material which will not establish an electro-potential with the valve body, synthetic sapphire being the preferred material. The diameter of the ball 20 is intermediate that of the top and bottom portions of the conical bore 19 so as to circumferentially contact one wall portion of the conical bore 19 along its length and hermetically seal the passage 21 passing through the valve from its inlet end 16 to its outlet end 17, this passage comprising the inlet passage 18 and the connecting tapered bore 19. A flat spring 22, preferably of stainless steel, overlies the obliquely slanting outlet face 17 with the lower end of the spring soldered at 22a to the outlet face 17 and the upper end contacting the top of the ball 20 and forcing it downwardly into a sealing seating engagement with the conical bore 19. The embodiment of the spring illustrated has three loops to provide extra length. The constant of the spring can be varied by varying the width of the spring, thus providing for valves with different operating pressures. For example, the applicant has utilized springs with a high pressure valve setting in which the valve opens at pressure differentials exceeding 90 millimeters of saline solution, a medium pressure valve setting which opens at 65 millimeters of saline solution and a low pressure valve setting which opens at 35 millimeters of saline solution pressure.

The check valve 14 described above tightly fits into the interior of the large cylindrical end portion 24 of a hollow capsule 23, preferably made of stainless steel. The capsule 23 has two cylindrical end portions 24 and 25 of different diameters joined by a tapered intermediate section 26, the smaller end portion 25 being sized for connection to the tubing drain conduit (not illustrated). The exterior of the large end portion 24 of the capsule fits within one end of the flexible tubing connection 11 which connects the two valve assemblies 12 and 13.

As illustrated in FIGURE 2, in one valve assembly 12, the check valve 14 is installed with the inlet end face 16 of the valve body 15 adjacent the tapered intermediate section 26 of the capsule 23 so the inlet passage 18 is directly connected with the small diameter end portion 25 of the capsule. In the other valve assembly 13, the check valve 14 is installed in the capsule 23 in the reverse direction, that is, the inlet end face 16 of the valve body 15 is adjacent the open end of a large diameter end portion 24 of the capsule so that the slanting outlet end face 17 of the valve body is adjacent the small end portion 25 of the capsule.

Although the applicant has utilized stainless steel as the material for the capsule 23, the valve body 15 and the valve spring 22, it is obvious that other metals or stable materials which are essentially inert, non-toxic and unaffected by the sterilization temperatures and pressure conditions of the autoclave could be utilized. Likewise, although the applicant has chosen synthetic sapphire as material for the ball 20, other hard, inert and non-toxic materials could be substituted.

The manner in which the surgical drain controlled by the valve device is installed in the patient is well-known in the medical profession and will not be explained. The inlet end 26 of the valving device 10 is connected to the conduit tubing (not illustrated) which leads to the lateral ventricle of the patient and the outlet end 27 is connected to the conduit tubing which connects into the blood stream of the patient. Thus the two check valves, normally in the closed position, will permit the flow of cerebrospinal fluid when the pressure differential between the inlet end 26, which is established by pressure within the cerebral ventricles, exceeds that of the outlet end 27, which is established by the pressure in the blood stream, by the amount of the valve spring opening pressure. If desired, fluid can be pumped through the drain by alternately pressing and releasing the central portion of the flexible tubular connection 11 between the valves.

While the above describes and illustrates preferred embodiments of the invention, it should be understood that the invention is not restricted solely to the described embodiment but that it covers all modifications which should be apparent to one skilled in the art and which fall within the scope and spirit of the invention.

What is claimed is:
1. A hydrocephalus shunt device for controlling the drainage of cerebrospinal fluid in a conduit connecting between a source of cerebrospinal fluid and the circulatory system, said device comprising
 a plurality of check valves in which each said valve comprises,
  a rigid body having an inlet and an outlet end,
  an internal passage in said body connecting said inlet and outlet ends and including a section which is divergent along its length in the direction of said body outlet,
  a spherical ball of a diameter to sealingly fit within said divergent section at a valve seat and block said passage, and
  spring means resiliently pressing said ball into sealing contact with said seat at a positive pre-established pressure;
 conduit means connecting said valves in series with the outlet end of one valve body connected to the said inlet end of the next one in said series;
 means for connecting the inlet end of the first valve in said series to the conduit leading to the source of cerebrospinal fluid; and
 means for connecting the outlet end of the last valve in said series to the conduit leading to the circulatory system,
 said body, said ball and said spring means being of substantially inert, non-toxic material of which the physical properties are essentially unaffected by surgical sterilization temperatures.

2. The device of claim 1 wherein said spring means establishes a ball seating pressure of at least 10 mm. of saline solution.

3. The device of claim 1 wherein said ball is substantially harder than the material of said body and is of a material establishing no electrical potential between itself and said body.

4. The device of claim 3 wherein said ball is a hard mineral and said body is metal.

5. The device of claim 3 wherein said ball is sapphire and said body is stainless steel.

6. A hydrocephalus shunt valve device for controlling the drainage of cerebrospinal fluid in a conduit connecting between a source of cerebrospinal fluid and the circulatory system, said device comprising
 a pair of check valves,
 flexible tubular means for connecting the outlet of a first valve to the inlet of a second valve,
 each said valve comprising
  a rigid, hollow tubular capsule open at both ends with one end affixable to said cerebrospinal fluid drainage conduit and the other end affixable to an end of said flexible tubular connection,
  a rigid body tightly fitting within said capsule and having an inlet end and an outlet end,
  the inlet end of said body of said first valve being adjacent said one capsule end and the outlet end being adjacent said other capsule end,
  the inlet end of said body of said second valve being adjacent said other capsule end and the outlet end being adjacent said one capsule end,
  said body having an interior passage connecting said inlet and outlet ends with a portion of said passage having a section in cross section tapering in diameter along its length in the direction of said body outlet,
  a spherical ball of material substantially harder than said body and of a diameter to sealingly fit within said divergent section at a valve seat and block said passage when so seated, and
  spring means affixed to said body and overlying said ball pressing said ball against said seat with a fixed, predetermined pressure to establish a positive, predetermined valve opening pressure,
 said capsule, body, ball and spring means being of substantially inert, non-toxic material whose physical properties are essentially unaffected by surgical sterilization temperatures.

7. A device as described in claim 6 wherein
said body tightly fits within the larger diameter end portion of said capsule,
and said divergent section is a funnel-shaped bore extending into said body from said outlet end with the inner smaller diameter end of said funnel-shaped section communicating with the remainder of said passage leading to said body inlet end.

8. A device as described in claim 6 wherein the two end portions of said capsule are cylindrical and of different diameters, the large diameter end portion tightly fitting within said tubular connection and containing said body tightly fitting therewithin, said body is a portion of a cylinder obliquely cut lengthwise from a point on the top of said cylinder spaced from said inlet end to form an obliquely slanted face constituting said outlet end, said divergent section is a highly polished funnel-shaped passage extending downwardly from the upper end of said oblique face into said body to have the diameter decreasing toward the center of said body, the lower end of said funnel communicates with the remainder of said passage extending to the adjacent inlet and face of said body, said ball is a highly polished spherical ball, and said spring means is a flat spring affixed to said body.

9. In a hydrocephalus shunt valve device for controlling the drainage of cerebrospinal fluid through a conduit connecting a source of cerebrospinal fluid and the circulatory system to include a pair of check valves having the outlet end of the first valve connected to the inlet end of the second, the inlet end of the first valve connectable to that portion of the conduit leading to the source of cerebrospinal fluid and the outlet end of the second valve connectable to the circulatory system, the improvement wherein each check valve comprises a metal body having an internal passage connecting an inlet and an outlet end of said body, said passage includes a funnel-shaped section whose larger diameter end communicates with said body outlet end, a spherical ball fitting within said funnel-shaped section and of a material establishing no electrical potential with said body, said ball having a diameter intermediate the maximum and minimum diameters of said funnel-shaped section to sealingly seat in one portion thereof and block said passage when so seated, and a spring affixed to said body to overlie said ball within said funnel-shaped section pressing said ball at a fixed, predetermined pressure into sealing engagement with one wall portion of said section, said body, ball and spring being of substantially inert, non-toxic material whose physical properties are essentially unaffected by surgical sterilization temperatures.

10. In a hydrocephalus shunt valve device for controlling the drainage of cerebrospinal fluid through a conduit connecting a source of cerebrospinal fluid and the circulatory system to include a pair of check valves having the outlet end of the first valve connected to the inlet end of the second, the inlet end of the first valve connectable to that portion of the conduit leading to the source of cerebrospinal fluid and the outlet end of the second valve connectable to the circulatory system, the improvement as described in claim 9 wherein:

said body is a portion of a cylinder obliquely cut lengthwise from a point on the top of said cylinder spaced from said inlet end to form an obliquely slanted face constituting said outlet end, said funnel-shaped section is highly polished and extends downwardly from the upper end of said body oblique face with the lower, smaller end of said funnel communicating with the remainder of said passage extending to the adjacent inlet face of said body, and said spring is a flat spring attached at its lower end to the lower portion of said obliquely slanted outlet end face and the upper end contacting said ball.

References Cited by the Examiner
UNITED STATES PATENTS

| 2,867,213 | 1/1959 | Thomas | 128—350 |
| 2,969,066 | 1/1961 | Holter et al. | 128—350 |
| 2,999,499 | 9/1961 | Willet | 218—214 |

FOREIGN PATENTS

| 864,457 | 1/1941 | France. |
| 71,674 | 4/1929 | Sweden. |

OTHER REFERENCES

The Lancet, vol. 1(64), #7326, p. 202, January 25, 1964.

Nulsen et al.: "Treatment of Hydrocephalus by Direct Shunt from Ventricle to Jugular Vein," from Surg. Forum, 1951, pp. 399–403.

RICHARD A. GAUDET, *Primary Examiner.*

DALTON L. TRULUCK, *Examiner.*